United States Patent

Kawakami

[11] Patent Number: 5,839,007
[45] Date of Patent: Nov. 17, 1998

[54] INTERNAL INDICATOR OF A VIEW FINDER IN A CAMERA

[75] Inventor: Sohichiroh Kawakami, Tokyo, Japan

[73] Assignee: Asahi Kogaku Kogyo Kabushiki Kaisha, Tokyo, Japan

[21] Appl. No.: 919,481

[22] Filed: Aug. 28, 1997

[30] Foreign Application Priority Data

Sep. 2, 1996 [JP] Japan ................................. 8-231748

[51] Int. Cl.$^6$ ................................................. G03B 17/20
[52] U.S. Cl. .......................................... 396/296; 396/385
[58] Field of Search ................................. 396/296, 373, 396/382, 384, 385, 386; 359/441, 442

[56] References Cited

U.S. PATENT DOCUMENTS 4,171,888 10/1979 Shono et al. .
4,279,489 7/1981 Shono et al. .
4,582,409 4/1986 Yamada et al. .
5,373,644 12/1994 Depaoli .
5,434,636 7/1995 Hasushita et al. .
5,604,554 2/1997 Kiriigaya ................................. 396/296

FOREIGN PATENT DOCUMENTS 1559613 1/1980 United Kingdom .
5130388 5/1984 United Kingdom .

OTHER PUBLICATIONS

A United Kingdon Search Report issued with GB application No. 9718601.9.

*Primary Examiner*—A. A. Mathews
*Attorney, Agent, or Firm*—Greenblum & Bernstein, P.L.C.

[57] ABSTRACT

An internal indicator apparatus of a finder for a camera includes an optical finder system which includes an eyepiece system. An indicator indicates photographing data which can be viewed through the eyepiece system. The indicator is located in the vicinity of an image forming plane defined by the optical finder system. A position adjusting mechanism moves the indicator along a predetermined direction so that an indication surface of the indicator is moved to the image forming plane, or an optically equivalent position thereof.

11 Claims, 6 Drawing Sheets

INTERNAL INDICATOR OF A VIEW FINDER IN A CAMERA

BACKGROUND OF THE INVENTION

1. Field of the Invention

The present invention relates to an indicator within a view finder of a camera and particularly to an indicator within a view finder of a single lens reflex camera.

2. Description of the Related Art

In a conventional view finder of a single lens reflex camera, an internal indicator is provided in the light path of an eyepiece optical system, for example, as shown in FIG. 6. In the single lens reflex camera shown in FIG. 6, object light incident upon and passing through a photographing lens 11 is reflected by a main mirror 12 to form an erect image on a focusing plate 13 of a first object image forming surface conjugate with a film surface (not shown). The object light is transmitted through the focusing plate 13 and is made incident upon an incident surface (reflection surface) 14a of a pentagonal prism 14. Thereafter, the object light is reflected by a first reflection surface 14b, the incident surface 14a and a second reflection surface 14c, of the pentagonal prism 14, before being emitted outward therefrom through an emission surface 14d. The object light emitted from the emission surface 14d of the pentagonal prism 14 is transmitted through a front relay lens L1 of an eyepiece (ocular optical system) 21 to form an erect real image on a secondary image forming surface 15. A photographer can view the enlarged erect real image formed on the secondary image forming surface 15 through a rear eyepiece lens L2.

An internal indicator 51' of the view finder is positioned such that the indication surface thereof lies in a plane including the secondary image forming surface 15. In the arrangement shown in FIG. 6, the internal indicator 51' is located on the lower portion of the secondary image forming surface 15. The photographer can clearly observe the indication within the indicator 51' together with the object image formed on the secondary image forming surface 15.

However, the possibility exists that the secondary image forming surface 15 may be offset from the correct position predetermined on design, due to a positional or mounting error of the front relay lens L1 during the manufacturing or assembling thereof. Consequently, the internal indicator 51' may be offset from the secondary image forming surface 15 in the optical axis direction. Under such circumstances it is impossible for the photographer to clearly view the indication within the internal indicator and the object image simultaneously.

SUMMARY OF THE INVENTION

It is an object of the present invention to provide an indicator apparatus in which the position of an internal indicator can be easily adjusted.

To achieve the object mentioned above, according to the present invention, an internal indicator apparatus of a finder for a camera is provided having an optical finder system which includes an eyepiece system, an indicator that indicates photographing data which can be viewed through the eyepiece system, and a position adjusting mechanism. The indicator is located in the vicinity of an image forming plane defined by the optical finder system. The position adjusting mechanism moves the indicator in a predetermined direction so that an indication surface of the indicator is moved to the image forming plane or an optically equivalent position thereof.

A reflector is preferably provided which reflects light emitted from the indication surface of the indicator toward an eyepiece lens group of the eyepiece system.

The camera is preferably a single lens reflex camera.

A first object image forming surface defined by a photographing lens is preferably located in, or in the vicinity of, a focusing plate of the finder optical system. The image forming plane is a secondary object image forming surface defined by the photographing lens and the optical finder system.

The predetermined direction can be perpendicular to an optical axis of the eyepiece system, or substantially parallel to an optical axis of the eyepiece lens group. The position adjusting mechanism can move the indicator away from and towards the reflector, or can move the indicator and the reflector together along the optical axis of the eyepiece system.

The indicator is preferably located between the secondary object image forming surface and the eyepiece lens group.

The reflector is preferably secured to the eyepiece system and the indicator is supported to move away from and towards the reflector by the position adjusting mechanism.

The reflector can consist of a prism having a triangular section which extends along the indicator.

The indication surface of the indicator preferably lies in a plane substantially parallel to the optical axis of the eyepiece system.

Preferably, the indicator is supported to move away from or towards the optical axis of the eyepiece system by screws provided in an eyepiece lens barrel body which supports the eyepiece system. Each of the screws can be provided with a compression spring between the eyepiece lens barrel body and the indicator to continuously bias the eyepiece lens barrel body and the indicator in a direction away from each other.

The present disclosure relates to subject matter contained in Japanese Patent Application No. 08-231748 (filed on Sep. 2, 1996) and which is expressly incorporated herein by reference in its entirety.

BRIEF DESCRIPTION OF THE DRAWINGS

The invention will be discussed below in detail, with reference to the accompanying drawings, in which.

DESCRIPTION OF THE PREFERRED EMBODIMENT

Figure 5:
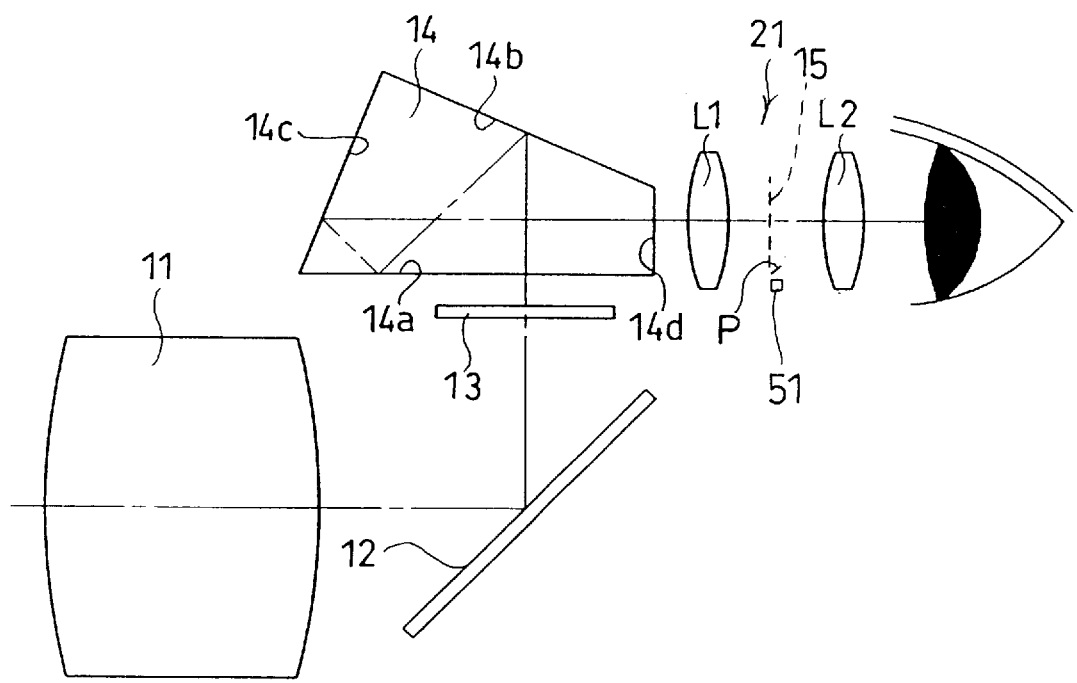
FIG. 5 is a schematic view of an internal indicator apparatus in a single lens reflex camera of the present invention.
Figure 6:
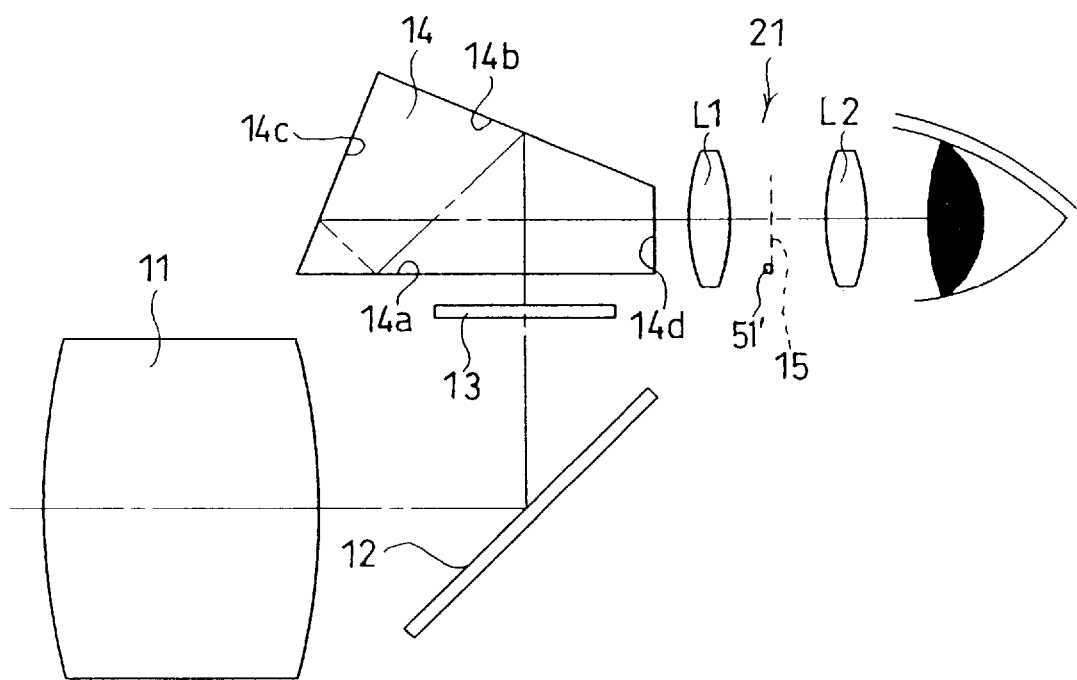
FIG. 6 is a schematic view of a known internal indicator apparatus in a single lens reflex camera.

The illustrated embodiment of the present invention is applied to an internal indicator 51 incorporated in an eyepiece of a single lens reflex camera shown in FIG. 5. It should be understood that apart from the internal indicator 51 (51'), the elements shown in FIG. 5 are the same as those shown in FIG. 6. The internal indicator 51 within the view finder indicates photographing data, such as a shutter speed, or an in-focus or out-of-focus state, using a light emitting means such as an LED (not shown) which is turned ON upon indication. The photographer can view the indicated data and/or the object image through the eyepiece within or outside of the field of view of the finder.

Figure 1:
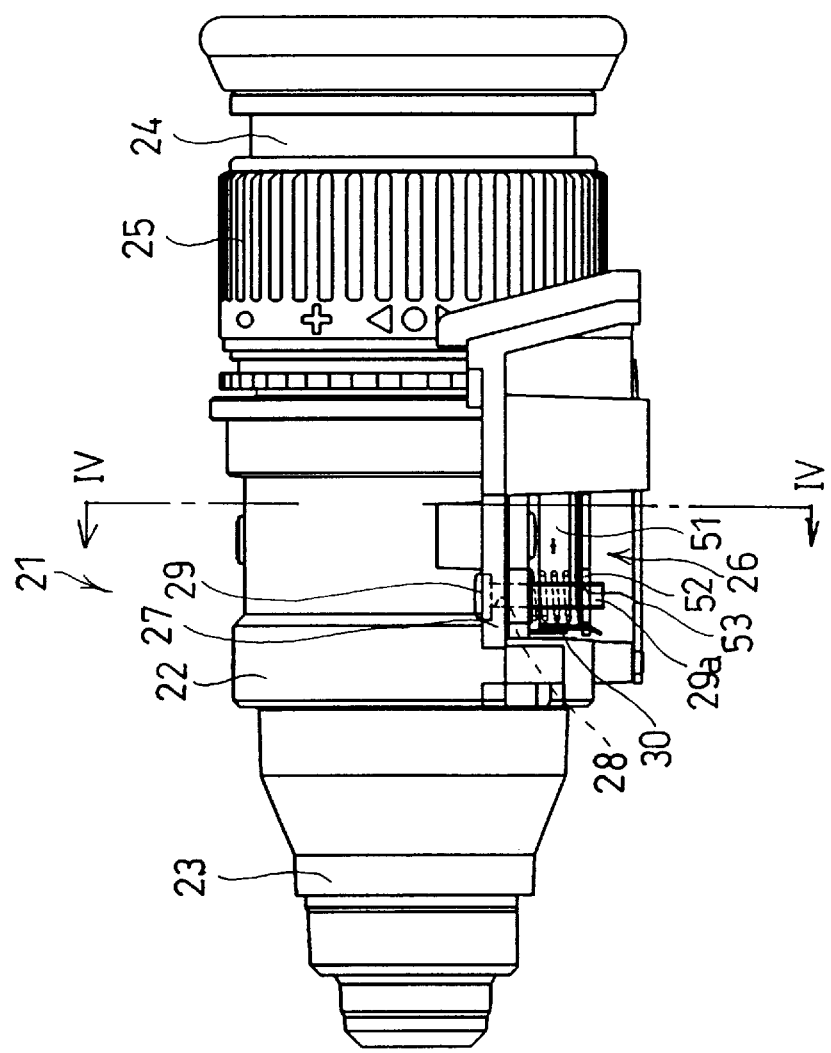
FIG. 1 is a partially broken side elevational view of an eyepiece body according to an embodiment of the present invention.

In FIG. 1, the eyepiece body to which the present invention is applied is partially cut-away for clarity. The eyepiece 21 is provided with a cylindrical eyepiece lens barrel body 22, a relay lens holding barrel 23, which is fitted to the front end of the eyepiece lens barrel 22 to hold a front relay lens group L1, and an eyepiece lens holding barrel 24 which is mounted to the rear end of the eyepiece lens barrel 22 to hold a rear eyepiece lens group L2.

The eyepiece lens holding barrel 24 is movable forward and backward relative to the eyepiece lens barrel body 22 in accordance with the rotation of a diopter adjusting ring 25.

Figure 3:
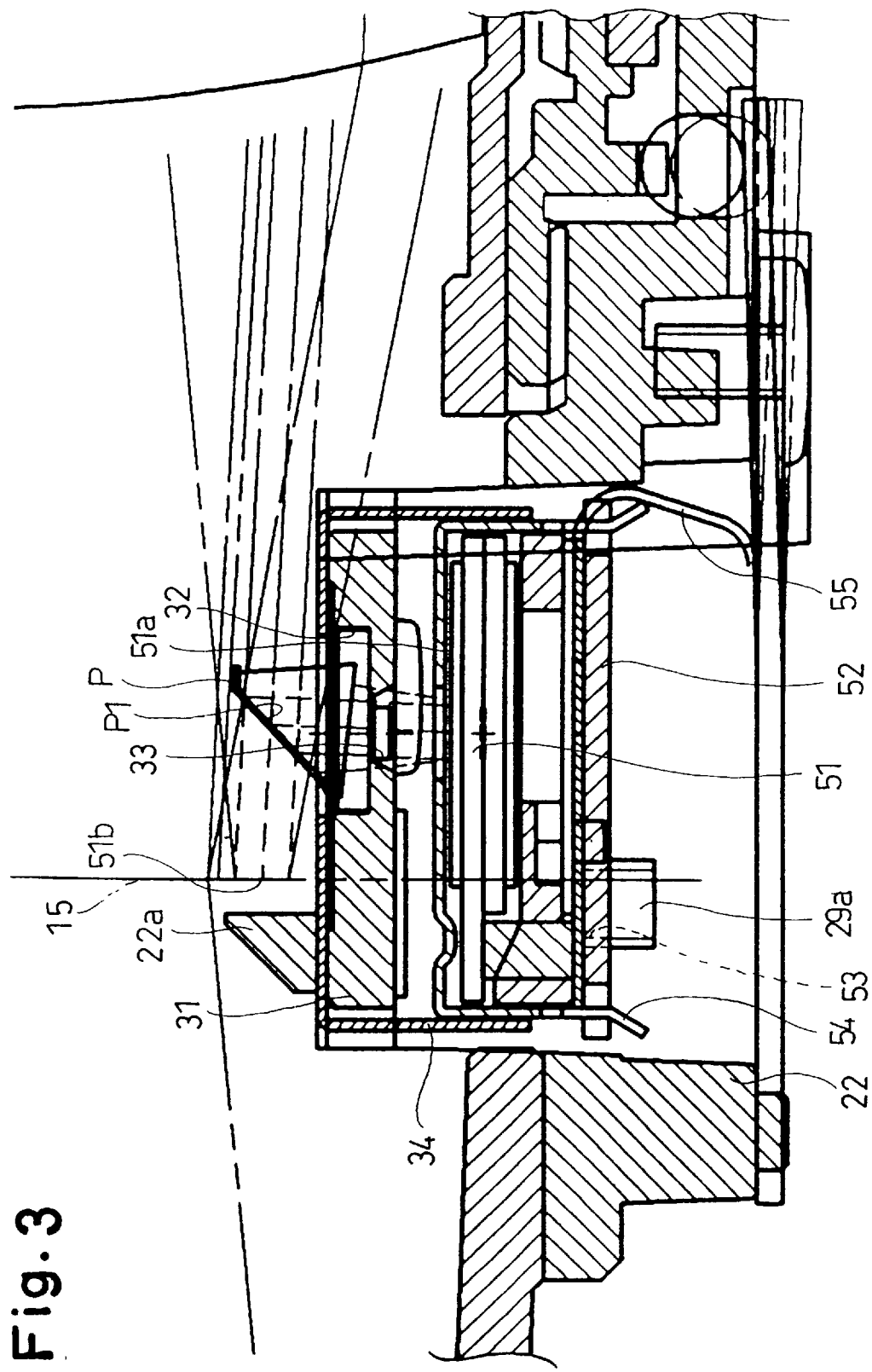
FIG. 3 is an enlarged sectional view of an internal indicator apparatus and the surroundings thereof.
Figure 4:
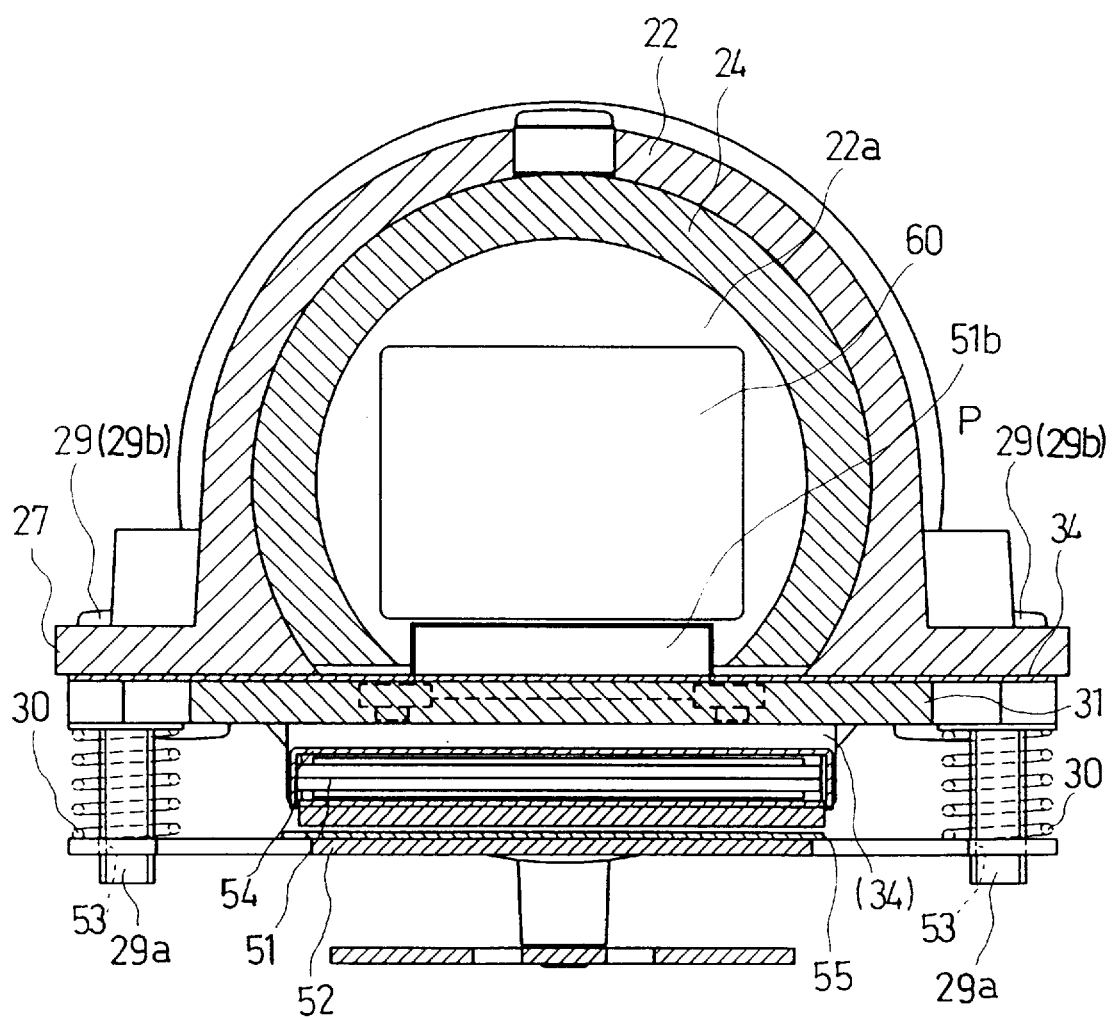
FIG. 4 is a sectional view taken along the line IV—IV in FIG. 1.

The internal indicator 51 and the surroundings thereof will be discussed below in more detail with reference to FIGS. 2 through 4.

Figure 2:
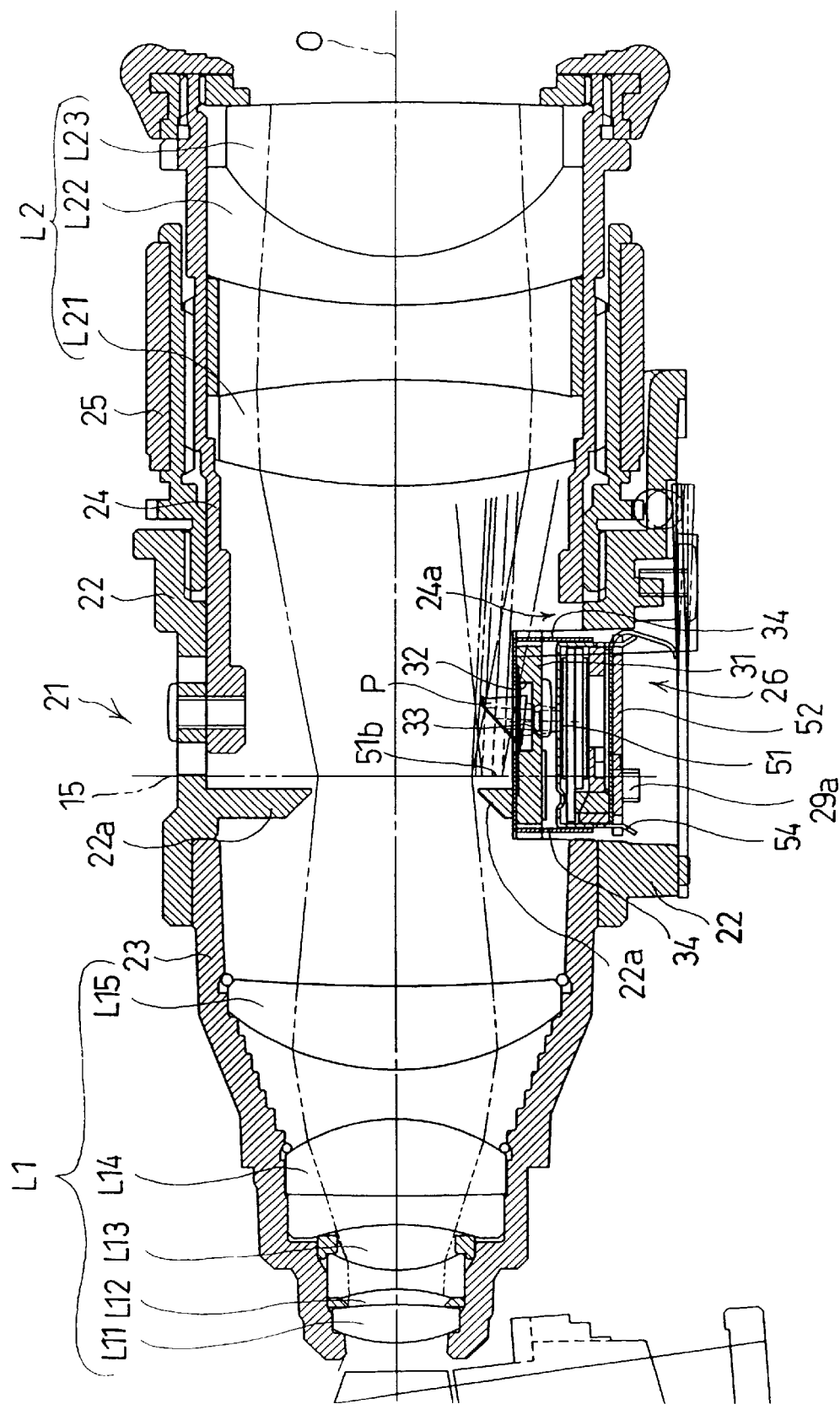
FIG. 2 is an enlarged longitudinal sectional view of the eyepiece body shown in FIG. 1, taken along the optical axis.

FIG. 2 is an enlarged longitudinal sectional view of the eyepiece body, taken along the optical axis (O). FIG. 3 is an enlarged sectional view of the internal indicator 51 and its surroundings, mounted to the eyepiece body shown in FIG. 2. FIG. 4 is a sectional view taken along the line IV—IV in FIG. 1.

The front relay lens group L1 includes a first lens element L11, a second lens element L12, a third lens element L13, a fourth lens element L14 and a fifth lens element L15, arranged in this order from the object side (the left side as viewed in FIG. 2). The rear eyepiece lens group L2 includes a first lens element L21, a second lens element L22 and a third lens element L23, arranged in this order from the object side.

The secondary image forming surface 15 is provided between the front relay lens group L1 and the rear eyepiece lens group L2.

The eyepiece lens barrel 22 is provided on the lower portion thereof with an indicator receiving hole 26 in which the internal indicator 51 is provided. More specifically, the internal indicator 51 is located between the secondary image forming surface 15 and the first lens element L21 of the rear eyepiece lens group L2. The outer peripheral surface of the eyepiece lens barrel body 22 which defines the peripheral edge of the indicator receiving hole 26 is integrally provided with an indicator supporting flange portion 27 projecting therefrom. The internal indicator 51 received in the indicator receiving hole 26 is supported to adjust the distance from the optical axis through a support mechanism including two support screws 29. The screws 29 are loosely inserted from above (as viewed in FIG. 1 or 4) in large diameter holes 28 formed in the indicator supporting flange portion 27. The indicator receiving hole 26 of the eyepiece lens barrel 24 has a cut-away portion 24a which receives the internal indicator 51 such that no interference occurs when the eyepiece lens barrel 24 is moved.

The substrate 52 of the internal indicator 51 is provided, on the portion thereof corresponding to the indicator supporting flange portion 27, with a pair of threaded holes 53 opposed to the holes 28. The screws 29 have heads 29b (as shown in FIG. 4) which abut against the indicator supporting flange portion 27 in which the holes 28 are formed, and threaded front portions 29a that extend through the holes 28 and are screwed in the threaded holes 53. The support screws 29 are provided with compression springs 30 between the indicator supporting flange portion 27 and the substrate 52. The compression springs 30 are adapted to continuously bias the substrate 52 away from the indicator supporting flange portion 27, i.e., away from an optical axis O of the eyepiece 21. With the support mechanism as constructed above, the internal indicator 51 can be moved perpendicularly away from or towards the optical axis O by rotating the support screws 29 in a clockwise or counterclockwise direction, respectively.

A prism support bridge 31 corresponding to the indicator receiving hole 26, is provided inside the eyepiece barrel body 22. Note that 22a designates the finder frame which defines the field of view 60 of the finder within the eyepiece barrel body 22. The prism support bridge 31 is provided with a prism holding recess 32 corresponding to the internal indicator 51. The prism holding recess 32 is provided on the bottom thereof with an indication window 33 opposed to an indication surface (light emission surface) 51a of the internal indicator 51.

A prism P having a triangular section and extending along the internal indicator 51 is opposed to the indication window 33 to reflect the indicator light. The indicator light of the internal indicator 51 is made incident upon the prism P through the indication window 33 and is reflected by a reflection surface P1 toward the rear eyepiece lens group L2. The indicator light is received by the eye of the photographer through the rear eyepiece lens group L2. Namely, the photographer can view the indication on the indication surface 51a of the internal indicator 51 as if the indication was indicated in the lower portion 51b of the field of view 60 (FIG. 4). Note that the indication surface 51a is provided with a large number of LEDs (not shown) in a matrix arrangement or arranged or formed along data to be indicated.

The prism support bridge 31 is fitted at the outer side surface thereof (exposed surface) in a guide box 34 which guides the internal indicator 51 so as to move away from or towards the optical axis O. The indication surface 51a of the internal indicator 51 is covered by a protection cover 54. The protection cover 54 comes into sliding contact at the outer side surface thereof with the inner side surface of the guide box 34, so that the internal indicator 51 can be movably guided in the guide box 34. Note that 55 designates a flexible printed circuit (FPC) board which connects the internal indicator 51 with an indicator drive circuit (not shown) provided in the camera body.

The position adjustment of the internal indicator 51 will now be described.

The eyepiece 21 is mounted to a measuring device (not shown). The measuring device is equivalent to a camera body to which the eyepiece 21 is to be mounted and is focused on an object located at a predetermined object distance. The adjustment is carried out such that the indication surface 51a of the internal indicator 51 is located at a position in the optical axis direction conjugate to the secondary image forming surface 15 defined by the measuring device. One of the most significant features of the present invention resides in the adjustment which is effected by the rotation of the indicator supporting screws 29.

If the screws 29 are rotated in one direction to fasten the same, the internal indicator 51 is moved upward against the compression springs 30 to reduce the distance between the prism P and the indicator 51.

Conversely, if the screws 29 are rotated in the other direction to loosen the same, the internal indicator 51 is moved downward due to the spring force of the compression springs 30 to increase the distance between the prism P and the internal indicator 51. If the distance between the prism P and the internal indicator 51 is reduced, an effect equivalent to the internal indicator 51 being retracted along the optical axis O (the distance between the internal indicator 51 and the eyepiece 21 is reduced) is obtained. If the distance between the prism P and the internal indicator 51 is increased, an effect equivalent to the internal indicator 51 being advanced along the optical axis O (the distance between the internal indicator 51 and the eyepiece 21 is increased) is obtained.

It is possible to adjust the position of the indication surface 51a of the internal indicator 51 to be conjugate with the secondary image forming surface 15 after the focusing operation has been carried out for a single lens reflex camera body in which the eyepiece 21 is incorporated and to which a photographing lens is mounted.

Although the above discussion has been directed to an embodiment in which the internal indicator 51 of the view finder is provided in the lower portion of the field of view, the location of the internal indicator is not limited thereto. Namely, the internal indicator can be located in the upper, right side, or left side portion of the field of view.

The reflection surface P1 can be replaced by a mirror. The support mechanism which movably supports the internal indicator 51 is not limited to the combination of the support screws 29 and the compression springs 30. For instance, in a modified support mechanism, the large diameter holes are formed in the internal indicator 51 and the threaded holes are formed in the eyepiece barrel body 22.

Also, it is possible to provide the prism P and the internal indicator 51 in the form of an integral unit (not shown). In this alternative, the integral unit is guided to move in the direction of the optical axis O through the support mechanism consisting of the support screws 29 and the compression springs 30.

As can be understood from the foregoing, according to the present invention, since the position of the internal indicator of the finder is located at a position conjugate with the secondary image forming surface defined by the photographing lens in the light path of the ocular optical system of the finder optical system is adjustable, the object image and the indication in the internal indicator can be clearly viewed simultaneously by the photographer.

What is claimed is:

1. An internal indicator apparatus of a finder for a camera, comprising:
    a finder optical system which includes an eyepiece system;
    an indicator that indicates photographing data which can be viewed through said eyepiece system, said indicator being located in the vicinity of an image forming plane defined by said finder optical system; and
    a position adjusting mechanism which moves said indicator along a predetermined direction so that an indication surface of said indicator is moved to one of said image forming plane and an optically equivalent position thereof;
    wherein said camera is a single lens reflex camera, a first object image forming surface defined by a photographing lens of the camera is located at one of on and in a vicinity of a focusing plate of said finder optical system, said image forming plane being a secondary object image forming surface defined by said photographing lens and said finder optical system.

2. An internal indicator apparatus of a finder according to claim 1, further comprising a reflector which reflects light emitted from said indication surface of said indicator toward an eyepiece lens group of said eyepiece system.

3. An internal indicator apparatus of a finder according to claim 2, wherein said predetermined direction is perpendicular to an optical axis of said eyepiece system, and said position adjusting mechanism moves said indicator away from and towards said reflector.

4. An internal indicator apparatus of a finder according to claim 3, wherein said indicator is located between said secondary object image forming surface and said eyepiece lens group.

5. An internal indicator apparatus of a finder according to claim 3, wherein said reflector is secured to said eyepiece system, and said indicator is supported to move away from and towards said reflector by said position adjusting mechanism.

6. An internal indicator apparatus of a finder according to claim 3, wherein said reflector comprises a prism having a triangular section which extends along said indicator.

7. An internal indicator apparatus of a finder according to claim 3, wherein said indication surface of said indicator lies in a plane substantially parallel to said optical axis of said eyepiece system.

8. An internal indicator apparatus of a finder according to claim 3, wherein said indicator is supported to move away from and towards said optical axis of said eyepiece system by screws provided in an eyepiece lens barrel body which supports said eyepiece system.

9. An internal indicator apparatus of a finder according to claim 8, wherein each of said screws is provided with a compression spring between said eyepiece lens barrel body and said indicator to continuously bias said eyepiece lens barrel body and said indicator away from each other.

10. An internal indicator apparatus of a finder according to claim 2, wherein said predetermined direction is substantially parallel to an optical axis of said eyepiece lens group, and said position adjusting mechanism moves said indicator and said reflector together along an optical axis of said eyepiece system.

11. An internal indicator apparatus of a finder for a camera, comprising:
    a finder optical system which includes an eyepiece system;
    an indicator that indicates photographing data which can be viewed through said eyepiece system, said indicator being located in the vicinity of an image forming plane defined by said finder optical system;
    a position adjusting mechanism which moves said indicator along a predetermined direction so that an indication surface of said indicator is moved to one of said image forming plane and an optically equivalent position thereof; and
    a reflector which reflects light emitted from said indication surface of said indicator toward an eyepiece lens group of said eyepiece system;
    wherein a first object image forming surface defined by a photographing lens of the camera is located at one of on and in a vicinity of a focusing plate of said finder optical system, said image forming plane being a secondary object image forming surface defined by said photographing lens and said finder optical system.

* * * * *

UNITED STATES PATENT AND TRADEMARK OFFICE
CERTIFICATE OF CORRECTION

PATENT NO. : 5,839,007
DATED : November 17, 1998
INVENTOR(S) : Sohichiroh KAWAKAMI It is certified that error appears in the above-identified patent and that said Letters Patent is hereby corrected as shown below:

On the title page:

Reference Cited US Patent, item [56], line 7, (second column, line 2) of the printed patent, "kiriigaya" should be —Kirigaya—.

Reference Cited US Foreign Patent Documents, item [56], line 10, (second column, line 5) of the printed patent, "5130388" should be —2130388—.

Signed and Sealed this

Fourteenth Day of December, 1999

Attest:

Q. TODD DICKINSON

Attesting Officer

Acting Commissioner of Patents and Trademarks